United States Patent
Moy et al.

(10) Patent No.: US 10,892,897 B2
(45) Date of Patent: Jan. 12, 2021

(54) SYSTEM AND METHOD FOR USING A DISTRIBUTED LEDGER GATEWAY

(71) Applicant: JPMorgan Chase Bank, N.A., New York, NY (US)

(72) Inventors: Christine Moy, New York, NY (US); Amber Baldet, Brooklyn, NY (US); Tyrone Lobban, London (GB); Suresh Shetty, Monmouth Junction, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 280 days.

(21) Appl. No.: 16/020,473

(22) Filed: Jun. 27, 2018

(65) Prior Publication Data

US 2018/0375840 A1 Dec. 27, 2018

Related U.S. Application Data

(60) Provisional application No. 62/525,600, filed on Jun. 27, 2017.

(51) Int. Cl.
| | |
|---|---|
| H04L 9/32 | (2006.01) |
| H04L 29/06 | (2006.01) |
| H04L 29/08 | (2006.01) |
| G06F 16/27 | (2019.01) |
| H04L 9/06 | (2006.01) |

(52) U.S. Cl.
CPC ............ *H04L 9/3239* (2013.01); *G06F 16/27* (2019.01); *H04L 63/0428* (2013.01); *H04L 63/0464* (2013.01); *H04L 63/123* (2013.01); *H04L 67/1042* (2013.01); *H04L 67/42* (2013.01); *H04L 69/22* (2013.01); *H04L 9/0637* (2013.01); *H04L 67/02* (2013.01); *H04L 2209/38* (2013.01)

(58) Field of Classification Search
CPC ........... G06F 16/27–278; H04L 9/0637; H04L 9/0643; H04L 9/3239; H04L 2209/38; H04L 2209/56; H04L 63/0428–0478; H04L 63/123; H04L 67/1042–1059; H04L 67/42; H04L 69/22
See application file for complete search history.

(56) References Cited

U.S. PATENT DOCUMENTS

2016/0275461 A1  9/2016  Sprague et al.
2017/0046638 A1*  2/2017  Chan ....................... G06Q 40/08
(Continued)

OTHER PUBLICATIONS

International Searching Authority, International Search Report and Written Opinion, International Application No. PCT/US18/39780, pp. 1-8, Sep. 17, 2018.

*Primary Examiner* — Kevin Bechtel
(74) *Attorney, Agent, or Firm* — Greenberg Traurig LLP

(57) ABSTRACT

System and method for using a distributed ledger gateway are disclosed. In one embodiment, in an information processing apparatus comprising at least one computer processor, a method for interacting with a plurality of distributed ledgers may include: (1) receiving a client request comprising a payload to be written to one of a plurality of distributed ledgers and metadata extracted from the client request; (2) identifying a destination distributed ledger of the plurality of distributed ledgers; (3) logging a source of the request and the destination distributed ledger; (4) encrypting the payload; and (5) routing the encrypted payload to the destination distributed ledger.

12 Claims, 3 Drawing Sheets

(56) References Cited

U.S. PATENT DOCUMENTS

2017/0134161 A1    5/2017  Goeringer et al.
2017/0148021 A1    5/2017  Goldstein et al.
2017/0364698 A1 †  12/2017 Goldfarb et al.
2018/0113752 A1 †  4/2018  Derbakova et al.

\* cited by examiner
† cited by third party

SYSTEM AND METHOD FOR USING A DISTRIBUTED LEDGER GATEWAY

RELATED APPLICATIONS

The present application claims priority to U.S. Provisional Patent Application Ser. 62/525,600, filed Jun. 27, 2017, the disclosure of which is hereby incorporated, by reference, in its entirety.

BACKGROUND OF THE INVENTION

1. Field of the Invention

The present disclosure generally relates to a system and method for using a distributed ledger gateway.

2. Description of the Related Art

"Distributed ledgers," such as Blockchain, provide cryptographically-verified ledgers where trust is not provided by a central authority, but is instead established by the dissemination of identical copies of the same ledger with cryptographic proof of its correctness.

SUMMARY OF THE INVENTION

System and method for using a distributed ledger gateway are disclosed. In one embodiment, in an information processing apparatus comprising at least one computer processor, a method for interacting with a plurality of distributed ledgers may include: (1) receiving a client request comprising a payload to be written to one of a plurality of distributed ledgers and metadata extracted from the client request; (2) identifying a destination distributed ledger of the plurality of distributed ledgers; (3) logging a source of the request and the destination distributed ledger; (4) encrypting the payload; and (5) routing the encrypted payload to the destination distributed ledger.

In one embodiment, routing information may be received with the client request and the metadata.

In one embodiment, the client request and metadata may be received from a first access point via a first adapter.

In one embodiment, the payload may be encrypted by the first adapter.

In one embodiment, the access point may include a server-based access point.

In one embodiment, the step of routing the encrypted payload to the destination distributed ledger may include invoking a second adapter to interface with the destination distributed ledger.

In one embodiment, the destination distributed ledger may include a plurality of destination distributed ledgers, and the at least a portion of the encrypted payload may be written to the plurality of destination distributed ledgers.

In one embodiment, the encrypted payload that is written to the destination distributed ledger may be accessible by only designated distributed ledgers or access points.

In one embodiment, the method may further include decrypting the encrypted payload using a second adapter.

According to another embodiment, a system for providing a gateway as a service may include a gateway; a plurality of first adapters, each first adapter in communication with an access point; and a plurality of second adapters, each second adapter in communication with one of a plurality of distributed ledgers. The gateway may receive a client request from one of the first adapters, the client request comprising a payload to be written to one of the plurality of distributed ledgers and metadata extracted from the client request, may identify a destination distributed ledger of the plurality of distributed ledgers; and may log a source of the request and the destination distributed ledger. The first adapter may encrypt the payload. The gateway may route the encrypted payload to the destination distributed ledger via one of the second adapters.

In one embodiment, the gateway may be provided as a service.

In one embodiment, routing information may be received with the client request and the metadata.

In one embodiment, the access point may include a server-based access point.

In one embodiment, the destination distributed ledger may include a plurality of destination distributed ledgers, and the at least a portion of the encrypted payload may be written to the plurality of destination distributed ledgers.

In one embodiment, the encrypted payload that is written to the destination distributed ledger may be accessible by only designated distributed ledgers or access points.

In one embodiment, the system may include an API gateway, wherein the API gateway may prioritize a plurality of client requests.

In one embodiment, the first adapter may extract metadata from the client message.

In one embodiment, the second adapter may decrypt the encrypted payload.

Systems and methods to facilitate transactional connectivity between clients, existing/traditional applications to Blockchain/Distributed Ledger platforms are disclosed. In one embodiment, a distributed ledger node hosting and servicing on behalf of the client may be provided, as well as connectivity for clients to seamlessly interact with one or many distributed ledger platforms/Blockchains.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein related to a distributed ledger gateway system and method for accessing one or more distributed ledgers. Examples of distributed ledgers include, for example, Blockchain ledgers, Ethereum-based ledgers, etc.

Embodiments may provide an organization with seamless access to one or more distributed ledgers. For example, a distributed ledger gateway may manage the identification of a distributed ledger, the interaction with the distributed ledger, etc.

In one embodiment, the gateway may be called as a restful API, an embeddable library that allows activities that are agnostic to the type of distributed ledger types, such as creating trades, amending trades, making payments, etc.

Although embodiments may be provided in the context of financial transactions, it should be recognized that embodiments have broad applicability and are not so limited.

Figure 1:
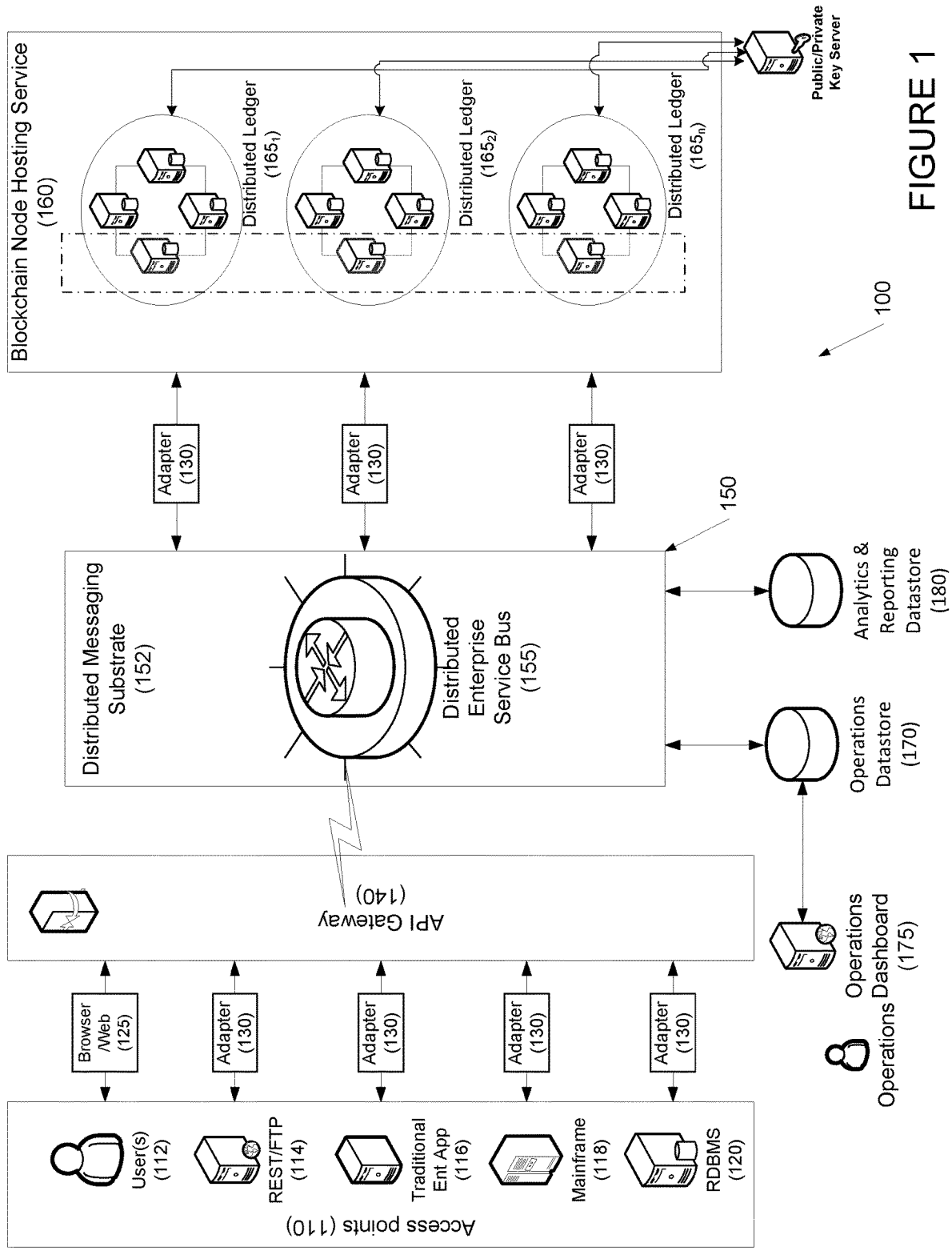
FIG. 1 depicts a distributed ledger gateway system according to one embodiment.

Referring to FIG. 1, a distributed ledger system is disclosed according to one embodiment. System 100 may include access points 110, including, for example, users 112, REST/FTP server 114, Enterprise Applications server 116, mainframe 118, relational database management system (RDBMS) (120), etc. Other access points may be included as is necessary and/or desired.

In one embodiment, access points 110 may include, for example, APIs over HTTPS (REST), SDK-based client adapter, browsers, etc. Any suitable mechanisms may be used as is necessary and/or desired based, for example, on client demands/requirements.

API gateway 140 may interface with access points 110 via browser 125 or one or more adapters 130. In one embodiment, a separate adapter 130 may be provided for each access point 110. In another embodiment, a single adapter 130 may service more than one access point 110.

In one embodiment, adapters 130 may extract metadata, perform encryption and/or decryption, and transform the payload localized to the nodes and endpoints. For example, encryption and/or decryption may be performed at the client's interface location (on premises of the client) to avoid any confidential or PI data from being exposed to the gateway or the transport layer. Thus, client information is protected during transit, and access to client information is restricted to the intended parties secure sites.

In another embodiment, encryption and/or decryption may be performed at the distributed ledger node location which may be deployed on behalf of the client, but not during transit or on gateway 150.

In one embodiment, API Gateway 140 may be responsible for connectivity, scalability, resiliency, availability, performance, security of endpoints/client interfaces, as well as throttling/prioritizing the traffic depending on demands and configuration of each client.

Distributed message substrate 152 may comprise distributed software deployed/hosted on an appropriate geographically distributed infrastructure that may be responsible for establishing secure connectivity and efficiently routing of data across both the senders and receivers.

Distributed message substrate 152 may include distributed enterprise service bus 155, which may route a transaction from any of access points 110.

In one embodiment, distributed message substrate 152 and distributed enterprise service bus 155 may be provided on a distributed and scalable infrastructure.

Although distributed message substrate 152 may be described in the context of distributed ledger interoperability and connectivity, it should be recognized that the disclosure is not so limited. Embodiments are agnostic to the technology or architecture of the sender or receiver. The adapter design combined with the distributed messaging and bus frameworks facilitates such a loosely coupled nature of the system.

Adapters 130 may interface between distributed messaging substrate 152 and blockchain node hosting service 160. In one embodiment, blockchain node hosting service 160 may host one or more distributed ledgers $165_1$, $165_2$, $165_n$. In one embodiment, distributed ledgers $165_1$, $165_2$, $165_n$ may be provided in a public cloud, private cloud, etc. Example distributed ledgers $165_1$, $165_2$, $165_n$ include, for example, Quorum, Axoni, Fabric, etc.

In one embodiment, the distributed ledgers $165_1$, $165_2$, $165_n$ may include nodes that may be hosted and/or managed by other entities (e.g., by other organizations, by Amazon, by Azure, etc.).

In one embodiment, distributed messaging substrate 152 and distributed enterprise service bus 155 together may comprise distributed messaging gateway 150.

System 100 may further include operations datastore 170 which may provide an interface via operations dashboard 175. In one embodiment, operations datastore 170 may collect the metadata information of the traffic flowing through gateway 150 to analyze and may assist in proactively managing the performance, availability, scalability, prioritization, connectivity, security of the data flowing through the same. Metadata may include, for example, time, frequency, size, etc. of the information being transferred. It does not include the content of the information being transferred. This is achieved by encrypting and decrypting the information at the respective endpoints/adapters involved in the exchange limiting the visibility of the same to a gateway messaging and routing layer responsible in transferring the information. In one embodiment, gateway messaging and routing is a centralized service but may be decentralized/distributed. The service may include a plurality of software components that can be deployed in a public cloud, private cloud, or on-premises depending on the scale of deployment and other requirements (e.g., regulatory, compliance, security, etc.).

System 100 may further include analytics and reporting datastore 180. Analytics and Reporting datastore 180 may be is utilized to store KPI (Key Performance Indicators) and metadata around the service being offered to various clients and technology assets. This information may assist in optimizing the platform to improve the Quality of Service (QoS) of the same. Examples include rate of requests per client, routing and delivery efficiency of the platform, availability, monitoring, prioritization of certain messages, security/defense against intentional attacks to disrupt the service, etc.

In one embodiment, gateway 150 may receive messages in one format and evaluate the message. In one embodiment, gateway 150 may identify a product that the message relates to, identify the sender and/or recipient, etc. Using some or all of this information, gateway 150 may then identify the distributed ledger 165 that the message should be routed to. In one embodiment, gateway 150 may also determine the format for the message should be in for the distributed ledger 165, and may reformat or translate the message to that format.

In one embodiment, gateway 150 may provide cryptographic proof (e.g., a Merkel proof) to the sending access point 112-120 of the message that the information that they had sent was actually recorded. Thus, the sending access point 112-120 may get proof of what actually exists on the distributed ledger 165, so that the sending access point 112-120 knows that there has not been any manipulation or mistranslation of that data.

In one embodiment, a mechanism for atomic transactions may be provided so gateway 150 may atomically transact with multiple chains ensuring that actions are applied across those chains in an all or nothing fashion. Thus, if a transaction cannot be written to all required distributed ledger 165, it is not written to any.

For example, if a transaction involves a bond movement and a cash movement, the transactions will only be written if both can be written to distributed ledger 165 for the cash movement, and the distributed ledger 165 for the bond movement.

In one embodiment, gateway 150 may manage and protect the keys for these clients and bind transactions accordingly with the correct key for the correct user. Thus, a third party will see that the transaction had actually come from the organization and it will not be evident that gateway 150 was involved. Thus, from a third party's perspective, the transactions are seamless, regular distributed ledger transaction as if the organization wrote the transaction to the distributed ledger.

In one embodiment, an indication may be provided if the organization desires to have an indication that the transaction used gateway 150. In one embodiment, this may be provided as metadata to the block of the distributed ledger.

Figure 2:
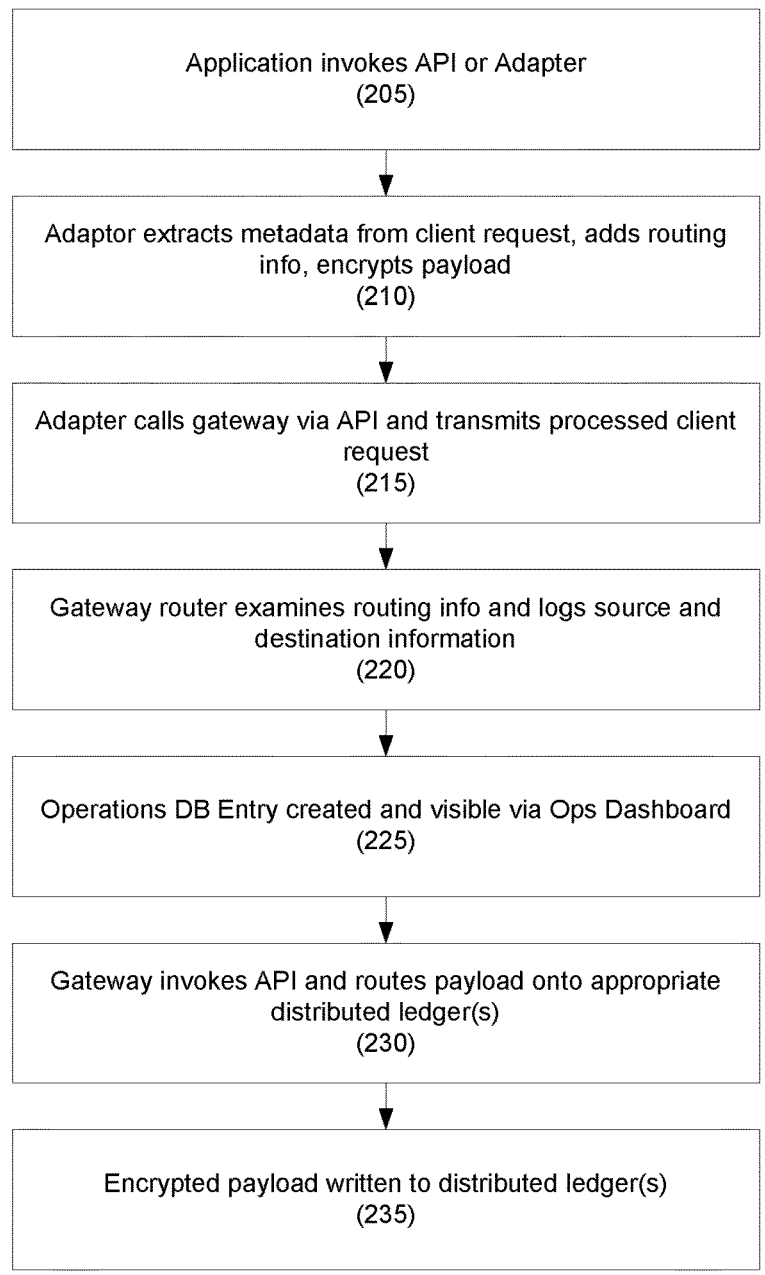
FIG. 2 depicts a method for using a distributed ledger gateway according to one embodiment.

Referring to FIG. 2, a method for using a distributed ledger gateway is disclosed according to one embodiment. In step 205, a client (e.g., a user, application, etc.) may invoke an API, an adapter, a browser, etc. to submit a client request, such as having a payload written to a distributed ledger.

In one embodiment, the client may host the adapter on its premises. In another embodiment, the client may just need an API endpoint to interface with the gateway. When the client hosts or integrated with the adapter, the determination of the target distributed ledger may be performed at the adapter, and the associated metadata may reflect the same. In embodiments, the gateway may act as a proxy/service provider on behalf of a client, and may make that determination based on, for example, the payload being sent to the gateway for routing. For example, the payload may identify an asset, and the asset class may be used to determine the distributed ledger, as different distributed ledgers may be targets for different asset classes. If more than one distributed ledger may service the same asset class, the client onboarding may be used to determine which distributed ledger may be chosen for a certain asset class and the same may be configured as a routing rule in the gateway layer.

In step 210, the adapter, API, browser, etc. may process the client request. In one embodiment, the processing may include, for example, extracting metadata from the client request, adding routing information (e.g., an identification of the target distributed ledger), and encrypting the underlying data (e.g., the payload). In one embodiment, this information may further be used to determine prioritization of certain asset classes depending on service level agreements ("SLAs"), etc.

In step 215, the adapter, API, browser, etc. may call the gateway, and may transmit the processed client request. For example, the metadata, routing information, and encrypted payload may be transmitted to the gateway.

In step 220, the gateway router may process the received processed client request. For example, the gateway router may examine routing information, and may log source (e.g., client) and destination information for tracking and traceability. The gateway router may not analyze, process, or examine the encrypted payload.

In step 225, and operations database entry may be created and may be visible via the operations dashboard. In one embodiment, the operations database entry may include, for example, Quality of Service data for the gateway platform. Exemplary attributes that may be collected include, for example, rate of requests per client, latency at the network layer and end points, availability of connectivity to the target distributed ledgers or other endpoints, etc.

In one embodiment, the operations database may interface with the operations dashboard, which may be used by, for example, a service operations team to monitor and act on alerts and/or send notifications to various clients on possible impact(s), disruption(s) of service, etc. The same information can be used to automate availability, performance of the service, etc.

In step 230, the gateway may invoke a second adapter and may route the encrypted payload onto the appropriate distributed ledger(s). As discussed above, in one embodiment, the determination of the appropriate distributed ledger may be made during client onboarding to the gateway service, based, for example, on the request at the time of the request, or may be delegated to the gateway based, for example, on attributes such as asset class, etc. Any other suitable technique and/or information may be used to identify the appropriate distributed ledger as is necessary and/or desired.

In step 235, the encrypted payload is written to the distributed ledger. In one embodiment, only designated distributed ledgers, clients, adapters, etc. may be able to decrypt the payload. For example, the encryption and decryption may be implemented using a PKI (Public Key Infrastructure) strategy, where the public and private keys may be held by their respective parties on either side of the transfer, and the keys may be stored in a HSM (Hardware Security Module). The adapter may be authorized to request and use the key to perform the necessary encryption/decryption. Other suitable methods may be used as is necessary and/or desired.

Figure 3:
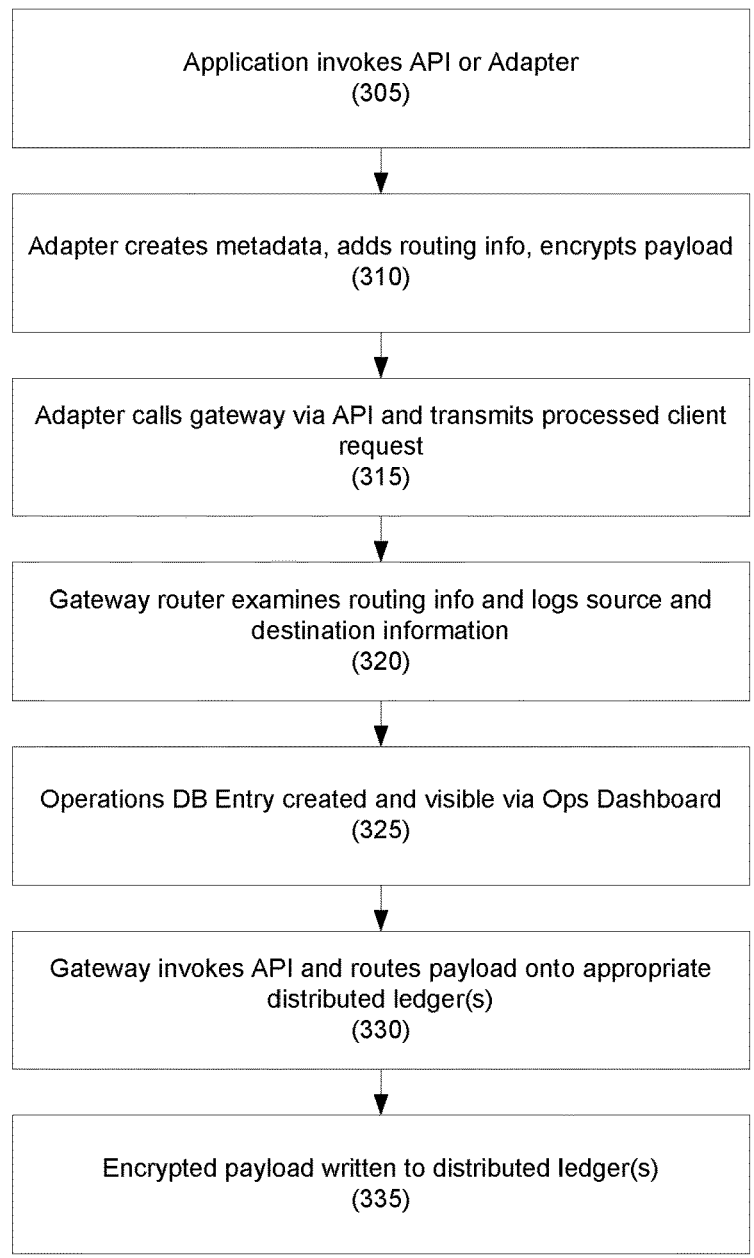
FIG. 3 depicts a method for using a distributed ledger gateway as a service according to one embodiment.

Referring to FIG. 3, a method for a method for using a distributed ledger gateway as a service is disclosed according to one embodiment. In embodiments, the gateway may act as a node service that may not be limited to routing and messaging. Thus, the gateway may act as both a node hosting service on behalf of the client and a messaging and routing service.

In step 305, a client (e.g., a user, application, etc.) may invoke an API, an adapter, a browser, etc. to submit a client request, such as having a payload written to a distributed ledger.

In step 310, the adapter, API, browser, etc. may process the client request. In one embodiment, the processing may include, for example, creating metadata from the client request, adding routing information, and encrypting the underlying data (e.g., the payload).

In step 315, the adapter, API, browser, etc. may call the gateway, and may transmit the processed client request. For example, the metadata, routing information, and encrypted payload may be transmitted to the gateway.

In step 320, the gateway router may process the received processed client request. For example, the gateway router may examine routing information, and may log source (e.g., client) and destination information for tracking and traceability. The gateway router may not analyze, process, or examine the encrypted payload.

In step 325, and operations database entry may be created and may be visible via the operations dashboard. This may be similar to step 225, above.

In step 330, the gateway may call an API and may route the encrypted payload onto the appropriate distributed ledger(s). In embodiments, the client may not be able to integrate the adapter/SDK; thus, the client and/or gateway may call the API end point directly. For example, if the target distributed ledger is hosted by a third party, and the gateway is required to integrate with the distributed ledger, the client may communicate directly with the distributed ledger without using the adapter. In this case, the adapter function may be part of the gateway itself, and not a distinct function/library.

In step 335, the encrypted payload is written to the distributed ledger. In one embodiment, only designated distributed ledgers, clients, adapters, etc. may be able to decrypt the payload. This may be similar to step 235, above.

In embodiments, the gateway may provide a cross-chain interoperability service.

Other embodiments/applications include, for example, chain to chain communications, distributed ledger to distributed ledger communications, mobile to distributed ledger communications, enterprise application to distributed ledger communications, cloud-hosted application to distributed ledger, combinations thereof, etc.

In embodiments, the payload may be transformed and/or split, and routed to a plurality of distributed ledgers, applications, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for interacting with a plurality of distributed ledgers, comprising:
   in a first adapter for an access point for a client:
      receiving a client request comprising a payload to be written to one of a plurality of distributed ledgers;
      extracting metadata from the client request;
      determining a target distributed ledger of the plurality of distributed ledgers based on the metadata;
      generating routing information identifying the target distributed ledger for the client request;
      encrypting the payload; and
      communicating the metadata, the routing information, and the encrypted payload to a gateway, wherein the gateway logs a source of the client request and the target distributed ledger based on the metadata and routes the encrypted payload to the target distributed ledger via a second adapter that is in communication with the target distributed ledger.

2. The method of claim 1, wherein the access point comprises a server-based access point.

3. The method of claim 1, wherein the target distributed ledger comprises a plurality of target distributed ledgers, and the at least a portion of the encrypted payload is written to the plurality of target distributed ledgers.

4. The method of claim 1, wherein the encrypted payload that is written to the target distributed ledger is accessible by only designated distributed ledgers or access points.

5. The method of claim 1, wherein the second adapter decrypts the encrypted payload.

6. A system for providing a gateway as a service, comprising:
- a gateway;
- a plurality of first adapters, each first adapter in communication with an access point for a client; and
- a plurality of second adapters, each second adapter in communication with one of a plurality of distributed ledgers;

wherein:
- one of the first adapters receives a client request from the access point with which it communicates, the client request comprising a payload to be written to one of the plurality of distributed ledgers;
- the first adapter extracts metadata from the client request;
- the first adapter determines a target distributed ledger of the plurality of distributed ledgers based on the metadata;
- the first adapter generates routing information identifying the target distributed ledger for the client request;
- the first adapter encrypts the payload;
- the first adapter communicates the metadata, the routing information, and the encrypted payload to the gateway;
- the gateway logs a source of the client request and the target distributed ledger based on the routing information; and
- the gateway routes the encrypted payload to the target distributed ledger via the second adapter that is in communication with the target distributed ledger.

7. The system of claim 6, wherein the gateway is provided as a service.

8. The system of claim 6, wherein the first access point comprises a server-based access point.

9. The system of claim 6, wherein the target distributed ledger comprises a plurality of target distributed ledgers, and the at least a portion of the encrypted payload is written to the plurality of target distributed ledgers.

10. The system of claim 6, wherein the encrypted payload that is written to the target distributed ledger is accessible by only designated distributed ledgers or access points.

11. The system of claim 6, wherein the gateway comprises an API gateway that prioritizes a plurality of client requests.

12. The system of claim 6, wherein the second adapter decrypts the encrypted payload.

\* \* \* \* \*